United States Patent
Yamasaki et al.

(10) Patent No.: US 12,365,788 B2
(45) Date of Patent: *Jul. 22, 2025

(54) RESIN COMPOSITION, RESIN COMPOSITION MOLDED BODY, AND POWER CABLE

(71) Applicant: SUMITOMO ELECTRIC INDUSTRIES, LTD., Osaka (JP)

(72) Inventors: Satoshi Yamasaki, Osaka (JP); Takanori Yamazaki, Osaka (JP); Fumitoshi Iyoda, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 293 days.

This patent is subject to a terminal disclaimer.

(21) Appl. No.: 17/763,420

(22) PCT Filed: Sep. 15, 2020

(86) PCT No.: PCT/JP2020/034825
§ 371 (c)(1),
(2) Date: Mar. 24, 2022

(87) PCT Pub. No.: WO2021/090578
PCT Pub. Date: May 14, 2021

(65) Prior Publication Data
US 2022/0340743 A1    Oct. 27, 2022

(30) Foreign Application Priority Data
Nov. 8, 2019  (JP) .................................. 2019-203149

(51) Int. Cl.
*C08L 23/12*   (2006.01)
*H01B 3/44*    (2006.01)
*H01B 9/00*    (2006.01)

(52) U.S. Cl.
CPC .............. *C08L 23/12* (2013.01); *H01B 3/441* (2013.01); *C08L 2203/202* (2013.01); *C08L 2205/02* (2013.01); *H01B 9/00* (2013.01)

(58) Field of Classification Search
None
See application file for complete search history.

(56) References Cited

U.S. PATENT DOCUMENTS

| | | |
|---|---|---|
| 6,414,059 B1 | 7/2002 | Kobayashi et al. |
| 2003/0194575 A1 | 10/2003 | Tau et al. |

(Continued)

FOREIGN PATENT DOCUMENTS

| | | |
|---|---|---|
| EP | 1221464 A1 | 7/2002 |
| EP | 2 637 178 A2 | 9/2013 |

(Continued)

OTHER PUBLICATIONS

Dec. 1, 2020 International Search Report issued in International Patent Application No. PCT/JP2020/034825.

(Continued)

*Primary Examiner* — Shawn Mckinnon
(74) *Attorney, Agent, or Firm* — Oliff PLC

(57) ABSTRACT

A resin composition contains propylene and ethylene and has a melting point of 140° C. or more and 150° C. or less, and an enthalpy of fusion of the resin composition is 60 J/g or more and 100 J/g or less.

12 Claims, 1 Drawing Sheet

(56) References Cited

U.S. PATENT DOCUMENTS

| | | | |
|---|---|---|---|
| 2004/0087751 A1 | 5/2004 | Tau et al. | |
| 2006/0045439 A1 | 3/2006 | Brown et al. | |
| 2006/0135699 A1* | 6/2006 | Li | C08L 23/142 |
| | | | 525/240 |
| 2007/0251572 A1 | 11/2007 | Hoya et al. | |
| 2007/0284787 A1* | 12/2007 | Weng | C08L 23/10 |
| | | | 525/50 |
| 2009/0076214 A1 | 3/2009 | Kiss et al. | |
| 2013/0011649 A1 | 1/2013 | Hoya et al. | |
| 2015/0325333 A1 | 11/2015 | Muto et al. | |
| 2018/0247737 A1 | 8/2018 | Holzmueller et al. | |
| 2018/0374602 A1* | 12/2018 | Perego | H01B 3/46 |
| 2021/0214539 A1 | 7/2021 | Cho et al. | |
| 2022/0340743 A1 | 10/2022 | Yamasaki et al. | |
| 2022/0372262 A1 | 11/2022 | Yamasaki et al. | |
| 2024/0270947 A1 | 8/2024 | Yamasaki et al. | |

FOREIGN PATENT DOCUMENTS

| | | |
|---|---|---|
| EP | 3 498 773 A1 | 6/2019 |
| JP | S57-69611 A | 4/1982 |
| JP | H09-204818 A | 8/1997 |
| JP | 2001-106844 A | 4/2001 |
| JP | 2002-170443 A | 6/2002 |
| JP | 2006-502455 A | 1/2006 |
| JP | 2006-505685 A | 2/2006 |
| JP | 2006-348136 A | 12/2006 |
| JP | 2009-534499 A | 9/2009 |
| JP | 2012-107212 A | 6/2012 |
| JP | 2014-084389 A | 5/2014 |
| JP | 6219268 B2 | 10/2017 |
| JP | 2019-104895 A | 6/2019 |
| WO | 2006/057361 A1 | 6/2006 |
| WO | 2007/120147 A1 | 10/2007 |

OTHER PUBLICATIONS

Dec. 1, 2020 International Search Report issued in International Patent Application No. PCT/JP2020/034826.
May 23, 2024 U.S. Office Action issued in U.S. Appl. No. 17/762,910.
Nov. 27, 2024 Office Action Issued in U.S. Appl. No. 17/762,910.
Li et al., "Influence of Crosslinking Agent Residues on Space Charge Distribution in XLPE," T.IEE Japan, vol. 112-A, No. 3, 1992, pp. 209-214.
Crosslinked Polyethylene Cable, Corono Publishing Co., Ltd. Atomica 08-04-02-14 (2006).

* cited by examiner

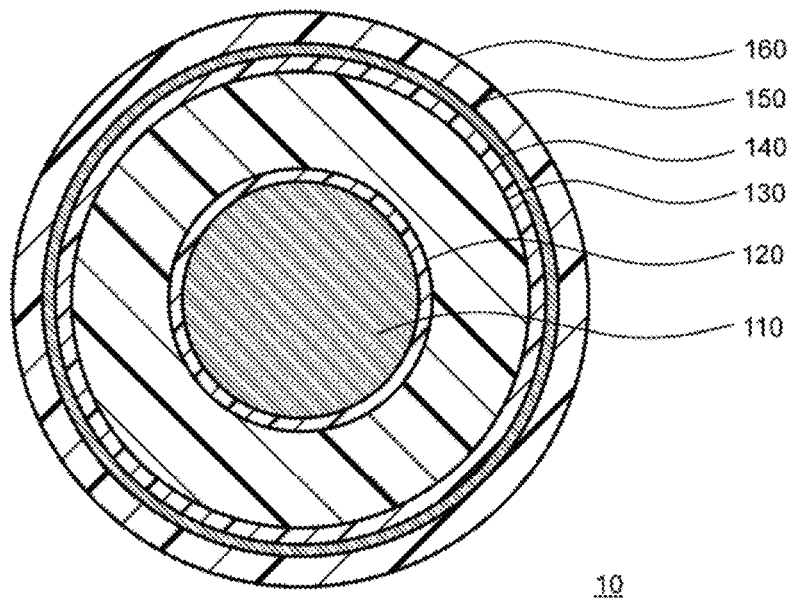

ized power cables having an insulating layer with a thickness of about 3 mm to 5 mm.

RESIN COMPOSITION, RESIN COMPOSITION MOLDED BODY, AND POWER CABLE

TECHNICAL FIELD

The present disclosure relates to a resin composition, a resin composition molded body, and a power cable.

The present application claims the benefit of priority based on Japanese Patent Application "No. 2019-203149" filed on Nov. 8, 2019, which is incorporated herein by reference in its entirety.

BACKGROUND ART

Crosslinked polyethylene has been widely used as a resin component for constituting an insulating layer in power cables and the like because crosslinked polyethylene has high insulating properties (e.g., Patent Document 1).

CITATION LIST

Patent Documents

Patent Document 1: JP-S57-69611A

SUMMARY OF INVENTION

According to an aspect of this disclosure, there is provided a resin composition containing:
propylene; and
ethylene,
in which the resin composition has a melting point of 140° C. or more and 150° C. or less, and
an enthalpy of fusion of the resin composition is 60 J/g or more and 100 J/g or less.

According to another aspect of this disclosure, there is provided a resin composition molded body that is made of a resin composition and with which an object is covered at a thickness of 3 mm or more, the molded body containing:
propylene; and
ethylene,
in which the molded body has a melting point of 140° C. or more and 150° C. or less, and
an enthalpy of fusion of the molded body is 60 J/g or more and 100 J/g or less, and
when an outer sample is collected from a position 0.5 mm from a surface of the molded body toward the object and an inner sample is collected from a position 0.5 mm from the object toward the surface,
an absolute value of a difference obtained by subtracting the melting point of the outer sample from the melting point of the inner sample is within 8° C., and
an absolute value of a difference obtained by subtracting the enthalpy of fusion of the outer sample from the enthalpy of fusion of the inner sample is within 10 J/g.

According to another aspect of this disclosure, there is provided a power cable including:
a conductor; and
an insulating layer with which an outer circumference of the conductor is covered at a thickness of 3 mm or more,
in which the insulating layer contains propylene and ethylene,
the insulating layer has a melting point of 140° C. or more and 150° C. or less,
an enthalpy of fusion of the insulating layer is 60 J/g or more and 100 J/g or less, and
when an outer sample is collected from a position 0.5 mm from a surface of the insulating layer toward the conductor and an inner sample is collected from a position 0.5 mm from the conductor toward the surface,
an absolute value of a difference between the melting point of the outer sample and the melting point of the inner sample is within 8° C., and
an absolute value of a difference between the enthalpy of fusion of the outer sample and the enthalpy of fusion of the inner sample is within 10 J/g.

BRIEF DESCRIPTION OF DRAWINGS

FIG. 1 is a schematic cross-sectional view of a power cable according to an embodiment of this disclosure taken along a direction that is orthogonal to the axial direction of the power cable.

DESCRIPTION OF EMBODIMENTS

Problem to be Solved by the Present Disclosure

Crosslinked polyethylene that has undergone aging and degradation cannot be recycled and is incinerated. Thus, there are concerns about the impact on the environment.

In view of this, in recent years, resin that contains propylene (also referred to as "propylene-based resin", hereinafter) has been gaining attention as a resin component for constituting an insulating layer. Propylene-based resin can satisfy insulating properties required of a power cable, even when it is a non-crosslinked resin. That is, it is possible to achieve insulating properties and recyclability. Furthermore, handleability, workability, and manufacturability can be improved by using propylene-based resin.

The inventors of the present invention conducted studies using a propylene-based resin as a resin component constituting an insulating layer, and they found that it is difficult to ensure various cable properties when the insulating layer had a thickness of 3 mm or more, in particular.

The present disclosure aims to provide a technique by which an insulating layer that contains propylene and ethylene and has a thickness of 3 mm or more enables various cable properties to be ensured.

Effects of the Present Disclosure

According to the present disclosure, with an insulating layer that contains propylene and ethylene and has a thickness of 3 mm or more, various cable properties can be ensured.

Description of Embodiments of the Present Disclosure

<Findings Obtained by Inventors>

First, an overview of the findings obtained by the inventors of the present invention will be described.

Usually, polypropylene itself is harder than polyethylene and the like. Also, the low-temperature brittleness resistance of polypropylene itself is lower than that of polyethylene and the like.

In order to improve the above-described properties of polypropylene, conventionally, a resin component obtained by adding ethylene-propylene rubber (EPR) or the like to polypropylene has been used in the technical field of bumpers for automobiles. The resin component can be softened and low-temperature brittleness can be improved by adding EPR to polypropylene.

In view of this, in order to improve the flexibility and low-temperature brittleness resistance of an insulating layer in the technical field of power cables, the inventors of the present invention tried adding a low-crystallinity resin such as EPR to a propylene-based resin as a resin component for constituting the insulating layer.

However, as a result of conducting studies about adding a low-crystallinity resin to a propylene-based resin, the inventors of the present invention found that it is difficult to ensure various cable properties, especially when the thickness of an insulating layer was set to 3 mm or more. Note that "various cable properties" here refer to flexibility, low-temperature brittleness resistance, insulating properties, and water tree resistance, for example.

When the amount of low-crystallinity resin is excessively small, the resin component is close to being polypropylene itself, and the crystallinity (crystal state: size and shape) and the crystal amount (the degree of crystallinity) of the resin component are likely to vary in the thickness direction of the insulating layer, for example. Specifically, the outer surface side of the insulating layer is in contact with outside air, and thus the cooling speed after molding is high. When the cooling speed is high, spherulites are unlikely to grow and the crystal amount is relatively small. On the other hand, the inner side (conductor side) of the insulating layer is not in contact with outside air, and thus the cooling speed after molding is low. When the cooling speed is low, spherulites grow to be coarse and the crystal amount is relatively large. As a result, the inner side of the insulating layer is harder and has poor low-temperature brittleness resistance. Also, on the inner side of the insulating layer, microcracks form in the spherulites and the insulating properties deteriorate. Furthermore, because the growth of coarse spherulites reduces the amount of amorphous regions, water is likely to concentrate on the interface between spherulites. Thus, water tree resistance decreases.

On the other hand, if the amount of low-crystallinity resin is excessively large, in particular, too much low-crystallinity resin enters propylene-based resin on the inner side of an insulating layer where the cooling speed is low, and the crystal growth of the propylene-based resin is excessively inhibited, for example. Thus, in contrast to the case where the amount of low-crystallinity resin is excessively small, the crystal amount is very small on the inner side of the insulating layer. As a result, the insulating properties of the insulating layer deteriorate.

In view of this, the inventors of the present invention adjusted a predetermined resin component and controlled the amount of crystals thereof. As a result of intensive studies, the inventors found that it is possible to ensure various cable properties by reducing variation of the melting point and variation in the enthalpy of fusion of the insulating layer in the thickness direction of the insulating layer, while keeping the melting point and the enthalpy of fusion of the insulating layer within predetermined ranges.

The present disclosure is based on the above-described findings found by the inventors of the present invention.

Embodiments of the Present Disclosure

Next, an embodiment of this disclosure will be listed and described.

(1) A resin composition according to an aspect of this disclosure contains
propylene; and
ethylene,
in which the resin composition has a melting point of 140° C. or more and 150° C. or less, and
an enthalpy of fusion of the resin composition is 60 J/g or more and 100 J/g or less.

According to this configuration, it is possible to ensure various cable properties.

(2) A resin composition molded body according to an aspect of this disclosure is a molded body that is made of a resin composition and with which an object is covered at a thickness of 3 mm or more, and the molded body contains
propylene; and
ethylene,
in which the molded body has a melting point of 140° C. or more and 150° C. or less,
an enthalpy of fusion of the molded body is 60 J/g or more and 100 J/g or less, and
when an outer sample is collected from a position 0.5 mm from a surface of the molded body toward the object and an inner sample is collected from a position 0.5 mm from the object toward the surface,
an absolute value of a difference obtained by subtracting the melting point of the outer sample from the melting point of the inner sample is within 8° C., and
an absolute value of a difference obtained by subtracting the enthalpy of fusion of the outer sample from the enthalpy of fusion of the inner sample is within 10 J/g.

According to this configuration, it is possible to ensure various cable properties.

(3) With the resin composition molded body according to (2) above,
a residue of a crosslinking agent is less than 300 ppm.

According to this configuration, it is possible to improve recyclability of the resin composition molded body.

(4) With the resin composition molded body according to (2) or (3) above,
an AC breakdown electric field at room temperature is 60 kV/mm or more.

According to this configuration, it is possible to suitably use the resin composition molded body as an insulating layer of the power cable.

(5) A power cable according to another aspect of this disclosure includes:
a conductor; and
an insulating layer with which an outer circumference of the conductor is covered at a thickness of 3 mm or more,
in which the insulating layer contains propylene and ethylene,
the insulating layer has a melting point of 140° C. or more and 150° C. or less,
an enthalpy of fusion of the insulating layer is 60 J/g or more and 100 J/g or less, and
when an outer sample is collected from a position 0.5 mm from a surface of the insulating layer toward the conductor and an inner sample is collected from a position 0.5 mm from the conductor toward the surface,
an absolute value of a difference between the melting point of the outer sample and the melting point of the inner sample is within 8° C., and
an absolute value of a difference between the enthalpy of fusion of the outer sample and the enthalpy of fusion of the inner sample is within 10 J/g.

According to this configuration, it is possible to ensure various cable properties.

Detailed Embodiments of the Present Disclosure

Next, an embodiment according to this disclosure will be described below with reference to the drawings. Note that this disclosure is not limited to these examples, and it is intended that this disclosure is shown by the claims, and that all changes in equivalent meanings and ranges to the scope of the claims are included.

Embodiment of the Present Disclosure (1) Resin Composition Molded Body

A resin composition molded body (also simply referred to as "molded body" hereinafter) according to this embodiment is made of a resin composition, and an object is covered with this molded body at a thickness of 3 mm or more, for example. Specifically, the resin composition molded body constitutes an insulating layer 130 of a power cable 10, which will be described later, for example. An object for the resin composition molded body is an elongated linear conductor 110, for example. The resin composition molded body is formed through extrusion molding so as to cover the outer circumference of the conductor 110, for example. That is, the resin composition molded body has the same shape in the longitudinal direction of the object, for example. Also, the length of the resin composition molded body in the longitudinal direction of the object is 30 cm or more, and is preferably 50 cm or more, for example.

The resin composition molded body according to this embodiment contains at least propylene (propylene unit) and ethylene (ethylene unit) as resin components, for example. A "resin component" here refers to a resin material constituting a main component of the resin composition molded body. A "main component" refers to a component in the highest content.

More specifically, the resin components constituting the resin composition molded body include a propylene-based resin and a low-crystallinity resin, for example. The crystal growth of the propylene-based resin can be inhibited by adding low-crystallinity resin to the propylene-based resin. Also, the crystallinity of the resin component can be controlled by adjusting the content of low-crystallinity resin added to the propylene-based resin.

Also, the resin composition molded body of this embodiment is non-crosslinked, for example. Alternatively, even when the resin composition molded body of this embodiment is crosslinked, the gel fraction (the degree of crosslinking) of the resin composition molded body is low. Specifically, the residue of a crosslinking agent in the resin composition molded body is less than 300 ppm, for example. Note that, when dicumyl peroxide is used as a crosslinking agent, examples of the residue include cumyl alcohol and α-methylstyrene. The recyclability of the resin composition molded body can be improved by using a non-crosslinked molded body or reducing the degree of crosslinking as described above.

(Melting Point and Enthalpy of Fusion)

Here, even when the composition of monomer units constituting the resin composition molded body of this embodiment is analyzed using a nuclear magnetic resonance (NMR) device, it is difficult to accurately find out whether monomer units such as the propylene unit and the ethylene unit are derived from the propylene-based resin or the low-crystallinity resin.

In contrast, the melting point and the enthalpy of fusion of the resin composition molded body are indexes that indicate the composition and the crystal amount of the resin components, and can be accurately and easily specified as analyzable indexes. Also, when variation in the melting point and variation in the enthalpy of fusion in the thickness direction of the resin composition molded body are small, the composition ratio of the resin components (the content of the low-crystallinity material) can be indirectly obtained based on the enthalpy of fusion of the resin composition molded body.

In this embodiment, the melting point and the enthalpy of fusion of the resin composition molded body are respectively specified as follows.

Specifically, with the resin composition molded body according to this embodiment, The molded body has a melting point of 140° C. or more and 150° C. or less,
 the enthalpy of fusion of the molded body is 60 J/g or more and 100 J/g or less, and
 when an outer sample is collected from a position 0.5 mm from the surface of the molded body toward the object and an inner sample is collected from a position 0.5 mm from the object toward the surface,
 the absolute value of the difference obtained by subtracting the melting point of the outer sample from the melting point of the inner sample is within 8° C., and
 the absolute value of the difference obtained by subtracting the enthalpy of fusion of the outer sample from the enthalpy of fusion of the inner sample is within 10 J/g.

Note that the "melting point" and the "enthalpy of fusion" here are measured through differential scanning calorimetry (DSC). "Differential scanning calorimetry" is performed in conformity with JIS-K-7121 (1987), for example. Specifically, with a DSC device, the temperature is increased from room temperature (e.g., 27° C.) to 220° C. at 10° C./min. Accordingly, a DSC curve can be obtained by plotting the amount of heat absorbed (heat flow) per unit time with respect to the temperature.

At this time, the temperature at which the amount of heat absorbed per unit time of the sample reaches is at its highest (highest peak) is defined as a "melting point (melting peak temperature)". Also, at this time, presuming that all heat absorbed by the sample is absorbed by the resin components, a value (J/g) obtained by dividing the amount of heat absorbed by the sample (J) from room temperature to 220° C. by the mass (g) of all of the resin components in the sample is defined as the "enthalpy of fusion". Note that the degree of crystallinity (%) of the sample can be obtained based on the enthalpy of fusion of the sample and theoretical values of the enthalpy of fusion of a perfect crystal.

The following describes details of specified values regarding the melting point of a molded body, the enthalpy of fusion of the molded body, the absolute value of the difference obtained by subtracting the melting point of the outer sample from the melting point of the inner sample, and the absolute value of the difference obtained by subtracting the enthalpy of fusion of the outer sample from the enthalpy of fusion of the inner sample.

In this embodiment, the molded body has a melting point of 140° C. or more and 150° C. or less, for example. In other words, the sample collected at any position of the molded body has a melting point of 140° C. or more and 150° C. or less, for example. The fact that the melting point is within the above-described range means that the resin composition molded body contains a propylene random polymer as a crystalline resin component.

When the melting point of the molded body is less than 140° C., the amount of low-crystallinity resin is excessively large. When the amount of low-crystallinity resin is excessively large, the crystal amount is small. Thus, the insulating properties of the resin composition molded body may deteriorate. In contrast, when the melting point of the molded body is higher than or equal to 140° C., the low-crystallinity resin content is less than or equal to a predetermined amount. In this embodiment, a predetermined amount or more of crystals can be ensured by setting the low-crystallinity resin content to a predetermined amount or less. This makes it possible to improve the insulating properties of the resin composition molded body.

On the other hand, when the melting point of the molded body is higher than 150° C., the amount of low-crystallinity resin is excessively small. When the amount of low-crystallinity resin is excessively small, the crystal amount is large. That is, the enthalpy of fusion is out of a specified range. Thus, as will be described later, it is difficult to ensure various cable properties. In contrast, when the melting point of the molded body is lower than or equal to 150° C., the low-crystallinity resin content is more than or equal to a predetermined amount. In this embodiment, the crystal amount can be kept from becoming excessively large by setting the low-crystallinity resin content to a predetermined amount or more. Thus, as will be described later, various cable properties can be ensured.

Also, the resin composition molded body of this embodiment contains a low-crystallinity resin as a resin component, and thus the amount of crystals of the resin component is smaller than the amount of crystals of the propylene-based resin itself. Specifically, the enthalpy of fusion of the molded body is 60 J/g or more and 100 J/g or less, for example. In other words, the enthalpy of fusion of the sample collected at any position of the molded body is 60 J/g or more and 100 J/g or less, for example.

When the enthalpy of fusion of the molded body is less than 60 J/g, the molded body has a low degree of crystallinity, that is, the molded body contains a small amount of crystals. In this case, the amount of low-crystallinity resin is excessively large. When the enthalpy of fusion of the molded body is less than 60 J/g and the molded body contains a small amount of crystals, the insulating properties of the resin composition molded body may deteriorate. In contrast, when the enthalpy of fusion of the outer sample is 60 J/g or more, a predetermined crystal amount or more of the molded body is ensured. In this case, the low-crystallinity resin content is less than or equal to a predetermined amount. In this embodiment, the insulating properties of the resin composition molded body can be improved by setting the enthalpy of fusion of the molded body to 60 J/g or more so as to ensure a predetermined amount of crystals.

On the other hand, when the enthalpy of fusion of the molded body is more than 100 J/g, the molded body has a high degree of crystallinity, that is, the molded body contains a large amount of crystals. In this case, the amount of low-crystallinity resin is excessively small, and the resin component is close to being a propylene random polymer itself. When the enthalpy of fusion of the molded body is more than 100 J/g and the molded body contains a large amount of crystals, the resin composition molded body is hard, and the resin composition molded body may have poor low-temperature brittleness resistance. Also, as the crystal amount of the resin composition molded body increases, the spherulites become excessively large, and thus the insulating properties may deteriorate due to microcracks in the spherulites. Furthermore, because the growth of coarse spherulites reduces the amount of amorphous regions, water is likely to concentrate at the interface between spherulites. Thus, water tree resistance may decrease. In contrast, when the enthalpy of fusion of the molded body is 100 J/g or less, the amount of crystals in the molded body is kept from becoming excessively large. In this case, the low-crystallinity resin content is more than or equal to the predetermined amount. In this embodiment, the resin composition molded body can be made flexible and low-temperature brittleness can be improved by setting the enthalpy of fusion of the molded body to 100 J/g or less so as to keep the crystal amount from becoming excessively large. Also, it is possible to suppress deterioration in insulating properties caused by microcracks in the spherulites of the resin composition molded body. Furthermore, by suppressing the growth of coarse spherulites and securing amorphous regions, it is possible to keep water from concentrating at the interface between spherulites. This makes it possible to improve the water tree resistance of the resin composition molded body.

Also, in this embodiment, by adjusting the low-crystallinity resin content such that the enthalpy of fusion of the molded body is within the specified range, variation in the melting point and variation in the enthalpy of fusion in the thickness direction of the resin composition molded body are small. Specifically, the absolute value of the difference obtained by subtracting the melting point of the outer sample from the melting point of the inner sample (also simply referred to as "difference in melting point" hereinafter) is less than or equal to (within) 8° C., for example.

When the difference in melting point is higher than 8° C., spherulites in the inner sample grow coarsely, for example. In this case, the amount of low-crystallinity resin is excessively small, and the resin component is close to being a propylene random polymer itself. As described above, when the difference in melting point is more than 8° C. and spherulites grow coarsely in the inner sample, it is difficult to ensure the flexibility, low-temperature brittleness resistance, insulating properties, and water tree resistance. In contrast, when the difference in melting point is less than or equal to 8° C., crystals are distributed in a well-balanced manner throughout the entire resin composition molded body, for example. In this case, the low-crystallinity resin content is more than or equal to the predetermined amount. In this embodiment, as described above, the flexibility, low-temperature brittleness resistance, insulating properties, and water tree resistance, which are examples of the various cable properties, can be ensured by setting the difference in melting point to 8° C. or less so that crystals are distributed in a well-balanced manner.

Note that the cooling speed is high on the outer surface side of the resin composition molded body, and thus spherulites in the outer sample are less likely to grow larger than spherulites in the inner sample. Therefore, the difference obtained by subtracting the melting point of the outer sample from the melting point of the inner sample is unlikely to be negative. However, even when the difference obtained by subtracting the melting point of the outer sample from the melting point of the inner sample is negative, the difference in melting point is −8° C. or more.

The absolute value of the difference obtained by subtracting the enthalpy of fusion of the outer sample from the enthalpy of fusion of the inner sample (also simply referred to as "the difference in the enthalpy of fusion" hereinafter) is less than or equal to (within) 10 J/g, for example.

When the difference in the enthalpy of fusion is more than 10 J/g, the inner sample contains a relatively large amount of crystals, for example. In this case, the amount of low-crystallinity resin is excessively small, and the resin component is close to being a propylene random polymer itself. As described above, when the difference in the enthalpy of fusion is more than 10 J/g and the inner sample contains a relatively large amount of crystals, it is difficult to ensure the flexibility, low-temperature brittleness resistance, insulating properties, and water tree resistance, which are examples of the various cable properties. Also, when the difference in the enthalpy of fusion is more than 10 J/g, the inner sample contains a relatively small amount of crystals, for example. In this case, the amount of low-crystallinity resin is excessively large. When the difference in the enthalpy of fusion is more than 10 J/g and the inner sample contains a relatively small amount of crystals, as described above, the insulating properties of the resin composition molded body may deteriorate. In contrast, when the difference in the enthalpy of fusion is less than or equal to 10 J/g, the crystal amount is uniform throughout the entire resin composition molded body, for example. In this embodiment, as described above, the flexibility, low-temperature brittleness resistance, insulating properties, and water tree resistance, which are examples of the various cable properties, can be ensured by setting the difference in the enthalpy of fusion to 10 J/g or less so as to make the crystal amount uniform.

Note that the above-described term "uniform" includes not only completely uniform but also uniform with a predetermined error.

In this embodiment, the difference in the enthalpy of fusion is within the specified range, and thus the low-crystallinity resin content, which will be described later, is also uniform in the thickness direction of the resin composition molded body.

(Propylene-Based Resin)

As described above, the propylene-based resin constituting the resin component according to this embodiment contains propylene and ethylene. That is, the propylene-based resin is made of a propylene random polymer (random polypropylene), for example.

In this embodiment, the tacticity of the propylene random polymer is isotactic, for example. The isotactic propylene random polymer is polymerized with a Ziegler-Natta catalyst and is versatile. By making the tacticity of the propylene random polymer isotactic, the melting point of the molded body can be kept within the above-described specified range. Also, by making the tacticity of the propylene random polymer isotactic, the low-temperature brittleness resistance can be improved without adding an excessive amount of a low-crystallinity resin. As a result, insulating properties can be ensured with ease.

Note that, for reference, examples of other kinds of tacticity include syndiotactic and atactic. However, syndiotactic and atactic tacticity are not preferably as the tacticity of the propylene random polymer of this embodiment.

The syndiotactic propylene random polymer is polymerized with a metallocene catalyst and is relatively expensive. When the tacticity of the propylene random polymer is syndiotactic, the melting point of the molded body will be excessively low, for example. Also, when the tacticity of the propylene random polymer is syndiotactic, the low-temperature brittleness thereof will be poor. In order to improve low-temperature brittleness, an excessive amount of low-crystallinity resin needs to be added. Thus, there is remarkable deterioration in insulating properties.

Also, when the tacticity thereof is atactic, the resin component does not crystallize. Therefore, various predetermined cable properties cannot be ensured.

The ethylene content in the propylene random polymer is 0.5 mass % or more and 15 mass % or less, for example. The effect of suppressing the growth of spherulites can be imparted by setting the ethylene content to 0.5 mass % or less. On the other hand, by setting the ethylene content to 15 mass % or less, it is possible to suppress a decrease in melting points and to stably realize use thereof under non-crosslinking or slight crosslinking.

The melting point of the propylene random polymer itself used in this embodiment has a melting point of 140° C. or more and 150° C. or less, for example. Also, the enthalpy of fusion of the propylene random polymer itself is 90 J/g or more and 105 J/g or less, for example. The elastic modulus (25° C.) of the propylene random polymer itself is 1000 MPa, for example.

(Low-Crystallinity Resin)

The low-crystallinity resin (amorphous resin) constituting the resin component according to this embodiment is a resin material that imparts flexibility to the resin composition molded body. The low-crystallinity resin does not have a melting point, or the low-crystallinity resin has a melting point of less than 100° C., for example. Also, the enthalpy of fusion of the low-crystallinity resin is 50 J/g or less, and preferably 30 J/g or less, for example.

The low-crystallinity resin according to this embodiment is made of a copolymer obtained through copolymerization of at least any two of ethylene, propylene, butene, hexene, and octene, for example.

Note that the monomer unit constituting the low-crystallinity resin preferably has a carbon-carbon double bond at α-position, for example.

Examples of the low-crystallinity resin include ethylene propylene rubber (EPR) and very low density polyethylene (VLDPE).

From the viewpoint of compatibility with the propylene-based resin, the low-crystallinity resin is preferably a copolymer containing propylene, for example. Specifically, an example of the copolymer containing propylene is EPR.

The ethylene content in EPR is 20 mass % or more, for example, and preferably 40 mass % or more, and more preferably 55 mass % or more. When the ethylene content is less than 20 mass %, the compatibility of EPR with the propylene-based resin will be excessively high. Thus, even when the EPR content in the molded body is reduced, the molded body can be made flexible. However, the effect of inhibiting crystallization of the propylene-based resin (also referred to as "crystallization inhibitory effect") may not be exhibited, and insulating properties may deteriorate due to microcracks in spherulites. In contrast, in this embodiment, by setting the ethylene content to 20 mass % or more, it is possible to suppress excessively high compatibility of EPR with the propylene-based resin. Thereby, it is possible to exhibit the crystallization inhibitory effect of EPR while obtaining the softening effect of EPR. As a result, it is possible to suppress deterioration in insulating properties. Furthermore, by setting the ethylene content to preferably 40 mass % or more and more preferably 55 mass % or more, it is possible to stably exhibit the crystallization inhibitory effect and stably suppress deterioration in insulating properties.

On the other hand, the low-crystallinity resin may be a propylene-free copolymer, for example. From the viewpoint of high availability, VLDPE is preferable as the propylene-free copolymer, for example. Examples of VLDPE include PE constituted by ethylene and 1-butene, and PE constituted by ethylene and 1-octene, for example. By adding the propylene-free copolymer as a low-crystallinity resin in this manner, it is possible to suppress complete compatibility when mixing a predetermined amount of low-crystallinity resin with the propylene-based resin. The crystallization inhibitory effect can be exhibited by setting such propylene-free copolymer content to a predetermined amount or more.

In this embodiment, when the total content of the propylene-based resin and the low-crystallinity resin is 100 parts by mass, the low-crystallinity resin content is 5 parts by mass or more and 30 parts by mass or less, and preferably 5 parts by mass or more and 25 parts by mass or less, for example.

When the low-crystallinity resin content is less than 5 parts by mass, the resin component is close to being the propylene random polymer itself, and the crystal amount increases. Thus, the enthalpy of fusion of the molded body exceeds the upper limit. Also, the amount of crystals of the resin component is likely to vary in the thickness direction of the resin composition molded body. Specifically, the specified values of the above-described difference in melting point and the above-described difference in the enthalpy of fusion are not satisfied. As a result, it is difficult to ensure the flexibility, low-temperature brittleness resistance, insulating properties, and water tree resistance, which are examples of the various cable properties.

In contrast, in this embodiment, by setting the low-crystallinity resin content to 5 parts by mass or more, it is possible to keep the resin component from being close to being the propylene random polymer itself, and to keep the amount of crystals from becoming excessively large. As a result, the enthalpy of fusion of the molded body can be set to the upper limit or less. Also, it is possible to suppress variation in the amount of crystals of the resin component in the thickness direction of the resin composition molded body. Specifically, the specified values of the above-described difference in melting point and the above-described difference in the enthalpy of fusion can be satisfied. As a result, the flexibility, low-temperature brittleness resistance, insulating properties, and water tree resistance, which are examples of the various cable properties can be ensured.

On the other hand, when the low-crystallinity resin content is more than 30 parts by mass, in particular, the insulating properties of the resin composition molded body obtained through extrusion molding at a thickness of 3 mm or more significantly deteriorate. This is because in particular, too much low-crystalline resin enters the propylene-based resin on the inner side of the resin composition molded body where the cooling speed is low, and the crystal growth of the propylene-based resin is excessively inhibited. Also, on the inner side of the resin composition molded body, inhibition of crystallization is facilitated due to resin flowing during extrusion in addition to slow cooling. Thus, the crystal amount is very small on the inner side of the resin composition molded body. That is, the enthalpy of fusion of the molded body is less than the lower limit. Note that it is conceivable that, on the outer side of the resin composition molded body, the crystal amount is likely to be small due to rapid cooling, and crystallization may be inhibited because the low-crystallinity resin content is high. However, in actuality, on the outer side of the resin molded body, the composition is rubbed against a metal die during extrusion, and thus molecular chains are oriented and the propylene-based resin is crystallized. Thus, the crystal amount is unlikely to decrease on the outer side of the resin composition molded body. As a result, the amount of crystals of the resin component is likely to vary in the thickness direction of the resin composition molded body. Specifically, the specified value of the above-described difference in the enthalpy of fusion is not satisfied. As a result, the insulating properties of the resin composition molded body deteriorate.

In contrast, in this embodiment, even when the molded body is formed through extrusion molding at a thickness of 3 mm or more, significant deterioration in insulating properties can be suppressed by setting the low-crystallinity resin content to 30 parts by mass or less. This is because, even on the inner side of the resin composition molded body, it is possible to keep the low-crystallinity resin from entering the propylene-based resin, and to suppress excessive inhibition of the crystal growth of the propylene-based resin. This makes it possible to ensure a predetermined crystal amount, on the inner side of the resin composition molded body. On the other hand, as described above, on the outer side of the resin composition molded body, although the crystal amount is likely to decrease due to slow cooling, the orientation of the molecular chains can cause the propylene-based resin to be crystallized and suppress a decrease in the crystal amount. Accordingly, the amount of crystals on the outer side of the resin composition molded body can be the same as that on the inner side of the resin composition molded body. That is, it is possible to ensure a predetermined amount or more of crystals throughout the entire resin composition molded body. As a result, even when the resin composition molded body is formed through extrusion molding at a thickness of 3 mm or more, it is possible to suppress significant deterioration in insulating properties. Furthermore, in this embodiment, the insulating properties of the resin composition molded body can be stably improved by setting the low-crystallinity resin content to 25 parts by mass or less.

Note that, for reference, when the resin composition molded body is formed through extrusion molding at a thickness of less than 3 mm, the resin composition molded body is thin, and thus the entire resin composition molded body cools rapidly. Thus, the low-crystallinity resin is unlikely to enter the propylene-based resin, and the crystal growth of the propylene-based resin is unlikely to be excessively inhibited. Also, the propylene-based resin is crystallized due to resin orientation, and the crystal amount is unlikely to decrease. Also, for reference, when the resin composition molded body is formed through press-molding, the entire resin composition molded body cools slowly. Therefore, even when the amount of low-crystallinity resin is large, the crystal growth is facilitated, and the crystal growth of the propylene-based resin is slightly inhibited. Thus, in these cases, even when the low-crystallinity resin content is more than 22 parts by mass, the insulating properties are unlikely to deteriorate.

(Other Additive Agents)

In addition to the above-described resin components, the resin composition molded body may contain an antioxidant, a copper inhibitor, a lubricant, and a coloring agent, for example.

However, it is preferable that the resin composition molded body according to this embodiment contains only a trace amount of the additive agent, which functions as a nucleating agent for producing propylene crystals, for example. Examples of the additive agent that functions as a nucleating agent include inorganic or organic substances such as flame retardants. Specifically, it is preferable that the content of the additive agent that functions as the nucleating agent is less than 1 part by mass when the total content of the propylene-based resin and the low-crystallinity resin is 100 parts by mass, for example. This makes it possible to suppress unexpected abnormal crystallization caused by the nucleating agent, and to easily control the crystal amount.

(2) Power Cable

Next, a power cable according to this embodiment will be described using FIG. 1. FIG. 1 is a cross-sectional view of the power cable according to this embodiment taken along a direction that is orthogonal to the axial direction of the power cable.

A power cable 10 according to this embodiment is configured as a so-called solid insulated power cable. Also, the power cable 10 according to this embodiment is configured to be installed on land (in a pipeline), underwater, or on the bottom of water, for example. Note that the power cable 10 is for alternating current (AC), for example.

Specifically, the power cable 10 includes the conductor 110, an inner semi-conductive layer 120, an insulating layer 130, an outer semi-conductive layer 140, a shielding layer 150, and a sheath 160, for example.

(Conductor (Conductive Portion))

The conductor 110 is formed by twisting a plurality of conductor core wires (conductive core wires) that contain pure copper, a copper alloy, aluminum, an aluminum alloy, or the like, for example.

(Inner Semi-Conductive Layer)

The inner semi-conductive layer 120 is provided so as to cover the outer circumference of the conductor 110. The inner semi-conductive layer 120 is semi-conductive, and is configured to keep an electric field from concentrating on the outer surface side of the conductor 110. The inner semi-conductive layer 120 contains conductive carbon black and at least one of ethylene-based copolymers such as an ethylene-ethyl acrylate copolymer, an ethylene-methyl acrylate copolymer, an ethylene-butyl acrylate copolymer, and an ethylene-vinyl acetate copolymer, olefin-based elastomers, and the above-described low-crystallinity resin, and the like, for example.

(Insulating Layer)

The insulating layer 130 is provided so as to cover the outer circumference of the inner semi-conductive layer 120, and is configured as the above-described resin composition molded body. As described above, the insulating layer 130 is formed through extrusion molding of the resin composition, for example.

(Outer Semi-Conductive Layer)

The outer semi-conductive layer 140 is provided so as to cover the outer circumference of the insulating layer 130. Also, the outer semi-conductive layer 140 is semi-conductive, and is configured to keep an electric field from concentrating between the insulating layer 130 and the shielding layer 150. The outer semi-conductive layer 140 is made of the same material as the inner semi-conductive layer 120, for example.

(Shielding Layer)

The shielding layer 150 is provided so as to cover the outer circumference of the outer semi-conductive layer 140. The shielding layer 150 is formed by winding a piece of copper tape, or is formed as wire shield in which a plurality of annealed copper wires or the like are wound, for example. Note that a piece of tape made of a rubberized cloth or the like may be wound around the inner side or the outer side of the shielding layer 150.

(Sheath)

The sheath 160 is provided so as to cover the outer circumference of the shielding layer 150. The sheath 160 is made of polyvinyl chloride or polyethylene, for example.

Note that the power cable 10 according to this embodiment may include a metal water shielding layer such as a so-called aluminum cover or iron wire armor outward of the shielding layer 150, when the power cable 10 is an underwater cable or a cable to installed on the bottom of water.

On the other hand, the power cable 10 according to this embodiment has the above-described water tree suppression effect, and thus the power cable 10 need not have a water shielding layer outward of the shielding layer 150, for example. That is, the power cable 10 according to this embodiment may have a non-complete water shielding structure.

(Specific Dimensions Etc.)

Although there are no particular limitations on specific dimensions of the power cable 10, the diameter of the conductor 110 is 5 mm or more and 60 mm or less, the thickness of the inner semi-conductive layer 120 is 0.5 mm or more and 3 mm or less, the thickness of the insulating layer 130 is 3 mm or more and 35 mm or less, the thickness of the outer semi-conductive layer 140 is 0.5 mm or more and 3 mm or less, the thickness of the shielding layer 150 is 0.1 mm or more and 5 mm or less, and the thickness of the sheath 160 is 1 mm or more, for example. An AC voltage applied to the power cable 10 of this embodiment is 20 kV or more, for example.

(3) Various Cable Properties

In this embodiment, the following various cable properties are ensured by reducing variation in the melting point and variation in the enthalpy of fusion of the insulating layer 130 (resin composition molded body) in the thickness direction of the insulating layer 130 while keeping the melting point and the enthalpy of fusion of the insulating layer 130 within predetermined ranges.

Note that, as described above, the "inner sample", which will be described later, refers to a sample collected from a portion located a position 0.5 mm from the conductor 110 toward the surface of the insulating layer 130. Because a relative amount of crystals in the inner sample is likely to be large or small, the various cable properties being satisfied in the inner sample means that the various cable properties of the entire resin composition molded body are also satisfied.

(Insulating Properties)

In this embodiment, the AC breakdown electric field strength of the insulating layer 130 at room temperature (e.g., 27° C.) is 60 kV/mm or more, for example. More specifically, the AC breakdown electric field is 60 kV/mm or more when a voltage is applied to the inner sample with a thickness of 0.2 mm under conditions that, at room temperature, an AC voltage with a commercial frequency (e.g., 60 Hz) was applied at 10 kV for 10 minutes, and thereafter a cycle including stepping up the AC voltage every 1 kV and applying the voltage for 10 minutes is repeated.

(Low-Temperature Brittleness Resistance)

In this embodiment, no cracking occurred when the inner sample was subjected to impact (the inner sample was hit) with an impact tool at −25° C. in conformity with JISK7216, for example.

(Flexibility)

In this embodiment, the tensile modulus of the inner sample is 900 MPa or less, for example, and preferably 800 MPa or less. Note that "tensile modulus" refers to a storage modulus obtained by using DVA-200 manufactured by IT Measurement Control Co., Ltd., and performing measurement including increasing the temperature from −50° C. to 200° C. in the tensile mode at a temperature increase rate of 10° C./min and recording the data at 30° C.

Also, in this embodiment, when the inner sample is bent at a diameter of 500 mm, the inner sample does not whiten, for example. Note that "whitening" here refers to a state where a color difference occurs between the bent portion and a non-bent portion before and after the sample is bent, and haze occurs.
(Water Tree Resistance)

In this embodiment, the maximum length of water trees occurring in the resin composition molded body serving as the insulating layer 130 is less than 150 μm, when an AC electric field with a commercial frequency (e.g., 60 Hz) of 4 kV/mm is applied to the resin composition molded body for 1000 hours, in a state where the resin composition molded body is immersed in a 1 N NaCl aqueous solution at room temperature (27° C.), for example. As a result, it is possible to stably suppress dielectric breakdown in the insulating layer 130 caused by water trees.

Note that the water trees occurring in the resin composition molded body are preferably short, and thus there is no limitation on the maximum length of the water trees. However, in this embodiment, because a predetermined amount of water trees may occur through the above-described tests, the maximum length of the water trees occurring in the resin composition may be 30 μm or more, for example.

Also, in this embodiment, the concentration of the number of water trees occurring in the resin composition molded body serving as the insulating layer 130 and having a length of 30 μm or more is less than 150 water trees/cm$^3$, when an AC electric field with a commercial frequency (e.g., 60 Hz) of 4 kV/mm is applied to the resin composition molded body for 1000 hours in a state where the resin composition molded body was immersed in a 1 N NaCl aqueous solution at room temperature (27° C.), for example. Accordingly, it is possible to stably suppress dielectric breakdown in the insulating layer 130 caused by water trees.

(4) Method for Manufacturing Power Cable

Next, a method for manufacturing a power cable according to this embodiment will be described. Hereinafter, step is abbreviated as "S".

(S100: Resin Composition Preparation Step)

First, a resin composition containing propylene and ethylene is prepared.

In this embodiment, a mixed material is formed by mixing (kneading) a resin component containing a propylene-based resin and a low-crystallinity resin, and other additive agents (antioxidant and the like), using a mixer. Examples of the mixer include an open roll, a Banbury mixer, a pressure kneader, a single-screw mixer, and a multi-screw mixer.

At this time, when the total content of the propylene-based resin and the low-crystallinity resin is 100 parts by mass, the low-crystallinity resin content is set to 5 parts by mass or more and 30 parts by mass or less, for example.

After the mixed material is formed, the mixed material is granulated using an extruder. As a result, pellet-shaped resin compositions, which are to constitute the insulating layer 130, are formed. Note that the steps from mixing to granulation may be collectively performed using a twin-screw extruder with high kneading action.

(S200: Conductor Preparation Step)

Meanwhile, the conductor 110 formed by twisting a plurality of conductor core wires together is prepared.

(S300: Cable Core Formation Step (Extrusion Step, Insulating Layer Formation Step))

When resin composition preparation step S100 and conductor preparation step S200 are complete, the insulating layer 130 is formed using the above-described resin composition so as to cover the outer circumference of the conductor 110 at a thickness of 3 mm or more.

At this time, in this embodiment, the insulating layer 130 is formed by using the resin composition containing the above-described low-crystallinity resin, such that the molded body has a melting point of 140° C. or more and 150° C. or less, the enthalpy of fusion of the molded body is 60 J/g or more and 100 J/g or less, the difference in melting point is 8° C. or less, and the difference in the enthalpy of fusion is 10 J/g or less.

Also, at this time, in this embodiment, the inner semi-conductive layer 120, the insulating layer 130, and the outer semi-conductive layer 140 are formed simultaneously using a three-layer simultaneous extruder, for example.

Specifically, in the three-layer simultaneous extruder, a composition for the inner semi-conductive layer is introduced into an extruder A for forming the inner semi-conductive layer 120, for example.

The above pellet-shaped resin composition is introduced into an extruder B for forming the insulating layer 130. Note that the set temperature of the extruder B is set to a temperature that is higher than a desired melting point by a temperature of 10° C. or more and 50° C. or less. The set temperature is preferably adjusted as appropriate based on the linear velocity and extrusion pressure.

A composition for an outer semi-conductive layer that contains the same material as the resin composition for an inner semi-conductive layer, which is introduced into the extruder A, is introduced into an extruder C for forming an outer semi-conductive layer 140.

Then, the extrudates from the extruders A to C are guided to a common head, and the inner semi-conductive layer 120, the insulating layer 130, and the outer semi-conductive layer 140 in this order are extruded simultaneously onto the outer circumference of the conductor 110 from the inner side to the outer side. As a result, the extruded material, which is to be a cable core, is formed.

Then, the extruded material is cooled using water, for example.

The cable core constituted by the conductor 110, the inner semi-conductive layer 120, the insulating layer 130, and the outer semi-conductive layer 140 is formed through the cable core formation step S300.

(S400: Shielding Layer Formation Step)

After the cable core is formed, the shielding layer 150 is then formed on the outer side of the outer semi-conductive layer 140 by winding a piece of copper tape therearound, for example.

(S500: Sheath Formation Step)

After the shielding layer 150 is formed, vinyl chloride is introduced into the extruder and extruded, and thus the sheath 160 is formed on the outer circumference of the shielding layer 150.

As a result, the power cable 10 is manufactured as a solid insulated power cable.

(5) Effects According to this Embodiment

According to this embodiment, one or more effects described below are obtained.

(a) The resin composition molded body according to this embodiment has a melting point of 140° C. or more and 150° C. or less, and the enthalpy of fusion thereof is 60 J/g or more and 100 J/g or less. That is, the resin composition constituting the molded body contains a propylene random polymer as a crystalline resin component. Also, the resin composition contains the low-crystallinity resin in a predetermined amount such that the enthalpy of fusion of the molded body is within the specified range. As a result of the molded body being formed through extrusion molding using such a resin composition, it is possible to reduce variation in the amount of crystals in the thickness direction while keeping the amount of crystals of the resin component in the molded body in an appropriate range. That is, crystals can be distributed in a well-balanced manner and the crystal amount can be made uniform throughout the resin composition molded body. Specifically, the absolute value of the difference obtained by subtracting the melting point of the outer sample from the melting point of the inner sample can be set to 8° C. or less, and the absolute value of the difference obtained by subtracting the enthalpy of fusion of the outer sample from the enthalpy of fusion of the inner sample can be set to 10 J/g or less. By reducing variation in the thickness direction of the molded body in this manner, it is possible to soften the resin composition molded body and improve low-temperature brittleness while using the propylene-based resin as a resin component. Also, it is possible to suppress deterioration in insulating properties caused by an insufficient crystal amount and to suppress deterioration in insulating properties caused by microcracks in coarse spherulites. Furthermore, by suppressing the growth of coarse spherulites and securing amorphous regions, it is possible to keep water from concentrating at the interface between spherulites. This makes it possible to improve the water tree resistance of the resin composition molded body. In this manner, in this embodiment, it is possible to ensure various cable properties.

(b) As described above, the outer sample has a melting point of 140° C. or more and 150° C. or less, and the resin composition molded body contains a propylene random polymer as the propylene-based resin. Because the molded body contains propylene random polymer as the propylene-based resin, it is possible to more easily control crystallinity during extrusion molding than in a case where the molded body contains a propylene homopolymer. Specifically, it is possible to expand set ranges of the extrusion temperature and the cooling speed for obtaining a desired crystal amount.

(c) In this embodiment, the residue of the crosslinking agent in the resin composition molded body is less than 300 ppm. This makes it possible to improve the recyclability of the resin composition molded body. As a result, it is possible to suppress the impact on the environment.

(d) According to this embodiment, the size of crystals is kept from becoming excessively small or excessively large throughout the entire resin composition molded body. Also, not only is the crystal amount uniform but also the sizes of crystals are uniform throughout the entire resin composition molded body. This makes it possible to improve the insulating properties of the resin composition molded body. Specifically, the AC breakdown electric field of the resin composition molded body at room temperature can be set to 60 kV/mm or more. As a result, the resin composition molded body according to this embodiment can be suitably used as the insulating layer of a power cable.

(e) It is preferable that the resin composition molded body according to this embodiment contains an additive agent that functions as a nucleating agent for producing propylene crystals in an amount of less than 1 part by mass, where the total content of the propylene-based resin and the low-crystallinity resin is 100 parts by mass, for example.

Here, when the resin composition molded body contains an additive agent that functions as a nucleating agent, the amount of crystals of the resin component will be uniform throughout the resin composition molded body due to the nucleating agent. However, the resin composition contains the additive agent, and thus the insulating properties of the resin composition molded body may deteriorate due to the additive agent. On the other hand, unexpected abnormal crystallization may occur due to the nucleating agent. In this case, microcracks may occur in a portion where abnormal crystal growth has occurred, and the insulating properties thereof may deteriorate.

In contrast, in this embodiment, even when the resin composition molded body contains a small amount of the additive agent that functions as the nucleating agent, by adding a predetermined amount of low-crystallinity resin, the amount of crystals of the resin component is kept from becoming excessively large, and variation in the amount of crystals of the resin component in the thickness direction of the resin composition molded body is suppressed. Also, deterioration in the insulating properties of the resin composition molded body caused by the additive agent can be suppressed by reducing the amount of the additive agent that functions as the nucleating agent in the resin composition molded body. Also, by reducing the amount of the additive agent that functions as the nucleating agent in the resin composition molded body, it is possible to suppress unexpected abnormal crystallization caused by the nucleating agent, and to easily control the crystal amount. This makes it possible to suppress deterioration in the insulating properties of the resin composition molded body.

Other Embodiments of this Disclosure

Although an embodiment according to this disclosure was described in detail above, this disclosure is not limited to the above-described embodiment, and various modifications can be made without departing from the gist thereof.

The embodiment was described in which the resin composition molded body serving as the insulating layer is formed through mechanical mixing and extrusion molding. However, the resin composition molded body may be formed through polymerization and extrusion molding.

Although the embodiment was described in which the power cable 10 need not have a water shielding layer, this disclosure is not limited to this. The power cable 10 may have a simple water shielding layer due to having the above-described remarkable water tree suppression effect. Specifically, a simple water shielding layer is constituted by metal laminated tape, for example. Metal laminated tape includes a metal layer made of aluminum, copper, or the like, and an adhesive layer provided on one or both sides of the metal layer, for example. The metal laminated tape is wrapped longitudinally around the outer circumference of a cable core (outer circumference outward of the outer semiconductive layer) so as to surround the cable core, for example. Note that this water shielding layer may be provided outward of the shielding layer, or may also serve as the shielding layer. With such a configuration, costs of the power cable 10 can be reduced.

Although the embodiment was described in which the power cable 10 is configured to be installed on land, underwater, or on the bottom of a body of water, this disclosure is not limited to this. The power cable 10 may also be configured as a so-called overhead wire (overhead insulated wire), for example.

Although three-layer simultaneous extrusion is performed in the cable core formation step S300 in the above-described embodiment, three layers may be extruded one by one.

EXAMPLES

Next, examples according to this disclosure will be described. These examples are examples of this disclosure, and this disclosure is not limited to these examples.

(1) Production of Power Cable

First, a predetermined resin composition was mixed using a Banbury mixer and granulated into pellets by an extruder. Then, a conductor with a cross-sectional area of 100 mm² was prepared. After the conductor was prepared, a resin composition for an inner semi-conductive layer containing ethylene-ethyl acrylate copolymer, the above-described resin composition, and a resin composition for an outer semi-conductive layer made of the same material as the resin composition for an inner semi-conductive layer were respectively introduced into the extruders A to C. The extrudates respectively extruded from the extruders A to C were guided to a common head, and the inner semi-conductive layer, the insulating layer, and the outer semi-conductive layer were extruded simultaneously onto the outer circumference of the conductor from the inner side to the outer side. At that time, the thicknesses of the inner semi-conductive layer, the insulating layer, and the outer semi-conductive layer were respectively 0.5 mm, 3.5 mm or 7 mm, and 0.5 mm. After extrusion was completed, the extruded material was cooled with water. As a result, power cables of samples A1 to A6, B1, and B3 to B5, each of which including the conductor, the inner semi-conductive layer, the insulating layer, and the outer semi-conductive layer from the center to the outer circumference thereof, were manufactured. Note that, with regard to the sample B2, the conductor was not covered with the resin composition, and the resin composition molded body was formed through press-molding.

[Samples A1 to A6]
(Molding Method)
 Extrusion molding
 Extrusion temperature: 170° C.
 Thickness of insulating layer: 3.5 mm, 7 mm
(Propylene-Based Resin)
 Propylene random polymer (random PP)
 Tacticity: isotactic
 Melt flow rate: 1.3 g/10 min
 Density: 0.9 g/ml
 Melting point: 145° C.
 Enthalpy of fusion: 100 J/g
(Low-Crystallinity Resin)
 Content: 5 to 30 parts by mass
Materials:
 Ethylene-propylene rubber (EPR)
 Ethylene content: 52 mass %
 Mooney viscosity ML (1+4) 100° C.: 40
 Enthalpy of fusion: none
 Very low density polyethylene (written as: VLDPE1)
 Copolymer of ethylene and 1-butene
 1-butene content: 40 mass %
 Melting point: 95° C.
 Enthalpy of fusion: 10 J/g
 Density: 0.88 g/ml
 Shore A hardness: 66
 Very low density polyethylene (written as: VLDPE2)
 Copolymer of ethylene and 1-octene
 1-octene content: 10 mass %
 Melting point: 55° C.
 Enthalpy of fusion: 24 J/g
 Density: 0.87 g/ml
 Shore A hardness: 70

[Sample B1]

The sample B1 was produced in the same manner as the sample A1, except that the thickness of the insulating layer was 1 mm and the low-crystallinity resin content was 35 parts by mass.

[Sample B2]
(Molding Method)
Press-Molding
 Preheating was performed at 180° C. for 2 minutes, pressure was applied at 180° C. for 1 minute, and then cooling was performed using water.
 Thickness of insulating layer: 3.5 mm
(Composition)
 The sample B2 was produced in the same manner as the sample A1, except that the low-crystallinity resin content was 35 parts by mass.

[Samples B3 to B5]

The samples B3 to B5 were produced in the same manner as the sample A1, except that the low-crystallinity resin contents were respectively 35 parts by mass, 3 parts by mass, and 0 parts by mass.

(2) Evaluation
(Sample Collection)

The insulating layer of each of the power cables of the samples A1 to A6, B1, and B3 to B5 was thinly slicing (stripped off), an outer sample was collected from a position 0.5 mm from the surface of the insulating layer toward the conductor and an inner sample was collected from a position 0.5 mm from the conductor toward the surface of the insulating layer. The thickness of the outer sample and the thickness of the inner sample were 0.5 mm. Note that only the outer sample was collected from the sample B1. Also, the outer sample and the inner sample were collected from the sample B2, presuming that one side is a (outer) surface and the other side is a surface on the conductor side. With regard to evaluation of water tree resistance, which will be described later, a sheet was produced separately.

(Melting Point and Enthalpy of Fusion)

DSC measurement was performed on the outer sample and the inner sample. DSC measurement was performed in conformity with JIS-K-7121 (1987). Specifically, (power compensating) DSC8500 manufactured by PerkinElmer, Inc. was used as a DSC device. A reference sample was α-alumina, for example. The mass of the sample was set to 8 to 10 mg. With the DSC device, the temperature was raised from room temperature (27° C.) to 220° C. at 10° C./min. Accordingly, a DSC curve was obtained by plotting the amount of heat absorbed (heat flow) per unit time with respect to the temperature.

At this time, the temperature at which the amount of heat absorbed per unit time of each sample was at its highest (highest peak) was defined as "melting point". Furthermore, at that time, with the DSC curve, the "enthalpy of fusion" was obtained by obtaining the area of a region surrounded by the melting peak and the base line.

With results that will be described later, the following ranges will be referred to as "specified ranges".
 Melting point: 140° C. or more and 150° C. or less
 Enthalpy of fusion: 60 J/g or more and 100 J/g or less
 The absolute value of the difference obtained by subtracting the melting point of the outer sample from the melting point of the inner sample (difference in melting point): 8° C. or less
 The absolute value of the difference obtained by subtracting the enthalpy of fusion of the outer sample from the enthalpy of fusion of the inner sample (difference in the enthalpy of fusion): 10 J/g or less (AC Breakdown Test)

The inner sample with a thickness of 0.5 mm was cut into a sample with a thickness of 0.2 mm, for an AC breakdown test. Then, a voltage was applied to the inner sample with a thickness of 0.2 mm under conditions that, at room temperature (27° C.), an AC voltage with a commercial frequency (e.g., 60 Hz) was applied at 10 kV for 10 minutes, and thereafter a cycle including stepping up the AC voltage every 1 kV and applying the voltage for 10 minutes is repeated. The electric field strength when the inner sample underwent dielectric breakdown was measured. As a result, when AC breakdown strength was 60 kV/mm or more, the sample was evaluated as being good.

(Low-Temperature Brittleness Test)

The inner sample was subjected to impact (the inner sample was hit) using an impact tool at −25° C. in conformity with JISK7216. Whether or not the sample cracked at that time was visually checked. As a result, when the sample did not crack, the sample was evaluated as "A (good)", and when the sample cracked, the sample was evaluated as "B (poor)".

(Tensile Test)

The storage modulus at 30° C. was obtained by performing a measurement in which the temperature is increased from −50° C. to 200° C. in the tensile mode at a temperature increase rate of 10° C./min, using DVA-200 manufactured by IT Measurement Control Co., Ltd. As a result, when the tensile modulus was 900 MPa or less, the sample was evaluated as being good.

(Bending Test)

The inner sample was bent at a diameter of 500 mm, and whether or not the inner sample was whitened was visually checked. As a result, when the sample did not whiten, the sample was evaluated as "A (good)", and when the sample whitened, the sample was evaluated as "B (poor)".

(Water Tree Resistance Test)

The insulating layer was thinly slicing (stripped off), and two sheets with a thickness of 1 mm were produced. After the sheets were produced, a predetermined semi-conductive sheet was sandwiched between the two sheets so as to form a laminated sheet. After the laminated sheet was formed, wiring was formed on the semi-conductive sheet.

Then, an AC electric field with 60 Hz and 4 kV/mm was applied to the sheet between the semi-conductive sheet and the aqueous solution for 1000 hours in a state where the laminated sheet was immersed in a 1 N NaCl aqueous solution at room temperature (27° C.).

After the predetermined AC electric field was applied, the laminated sheet was dried, and the laminated sheet was dyed by being boiled in a methylene blue aqueous solution. After the laminated sheet was dyed, the laminated sheet was sliced to a thickness of 30 μm along the laminating direction (i.e., a direction orthogonal to a main surface of the laminated sheet) to form an observation slice. Then, water trees occurring in the creeping direction of the semi-conductive sheet or in the direction orthogonal to the main surface of the semi-conductive sheet in the observation slice were observed by observing the observation slice using an optical microscope.

At that time, the maximum length of the water trees occurring in the sheet was measured. Also, the concentration of the number of water trees in the sheet each having a length of 30 μm or more was measured. Note that in Table 1, which will be described later, the "maximum length of water trees" was calculated by rounding off the longest length of the water trees occurring in ten observation slices that were selected at random, and the concentration of the number of water trees was calculated by rounding off the average of the concentrations of the numbers of water trees in ten randomly selected observation slices.

As a result, when the maximum length of water trees was less than 150 μm, the sample was evaluated as being good.

Also, when the concentration of the number of water trees that had a length of 30 μm or more was less than 150 water trees/cm$^3$, the sample was evaluated as being good.

Note that, for reference, in a conventional evaluation of water tree resistance, a power cable having an insulating layer made of a predetermined resin composition was produced, the power cable was immersed in water, and water trees were evaluated. At that time, a shielding layer and a sheath were provided on the outer side of the insulating layer of the power cable. Therefore, the insulating layer did not come into direct contact with water. In contrast, in this example, as described above, the laminated sheet was directly immersed in a predetermined aqueous solution, and water trees were evaluated. Therefore, the sheet was brought into direct contact with the aqueous solution. Thus, water tree resistance was evaluated in this example under more severe conditions than in the evaluation using a conventional power cable.

(3) Results

The results obtained by performing evaluation of each sample will be described below using the following Table 1.

|  |  | Samples | | | | | | | | | | |
| --- | --- | --- | --- | --- | --- | --- | --- | --- | --- | --- | --- | --- |
|  |  | A1 | A2 | A3 | A4 | A5 | A6 | B1 | B2 | B3 | B4 | B5 |
| Molding Method | | Extrusion | Extrusion | Extrusion | Extrusion | Extrusion | Extrusion | Extrusion | Press | Extrusion | Extrusion | Extrusion |
| Propylene-based Resin: Random PP (parts by mass) | | 95 | 80 | 80 | 70 | 80 | 80 | 65 | 65 | 65 | 97 | 100 |
| Low-crystallinity Resin | EPR (parts by mass) | 5 | 20 | 20 | 30 | | | 35 | 35 | 35 | 3 | |
| | VLDPE1 (parts by mass) | | | | | 20 | | | | | | |
| | VLDPE2 (parts by mass) | | | | | | 20 | | | | | |
| Thickness of Insulating Layer (mm) | | 3.5 | 3.5 | 7 | 3.5 | 3.5 | 3.5 | 1 | 3.5 | 3.5 | 3.5 | 3.5 |
| Outer Sample | Melting Point (° C.) | 142 | 143 | 143 | 143 | 142 | 143 | 140 | 141 | 140 | 144 | 145 |
| | Enthalpy of Fusion (J/g) | 97 | 81 | 82 | 64 | 88 | 91 | 64 | 62 | 72 | 102 | 105 |
| Inner Sample | Melting Point (° C.) | 143 | 143 | 143 | 143 | 143 | 145 | — | 142 | 141 | 148 | 150 |
| | Enthalpy of Fusion (J/g) | 100 | 83 | 87 | 65 | 94 | 98 | — | 63 | 52 | 115 | 118 |
| Difference | Melting Point (° C.) | 1 | 0 | 0 | 0 | 1 | 2 | — | 1 | 1 | 4 | 5 |
| | Enthalpy of Fusion (J/g) | 7 | 2 | 5 | 1 | 6 | 7 | — | 1 | −20 | 13 | 13 |
| Evaluation | AC Breakdown Strength (kV/mm) | 77 | 74 | 71 | 70 | 73 | 70 | 78 | 73 | 33 | 59 | 53 |

-continued

|  | Samples | | | | | | | | | | |
| --- | --- | --- | --- | --- | --- | --- | --- | --- | --- | --- | --- |
|  | A1 | A2 | A3 | A4 | A5 | A6 | B1 | B2 | B3 | B4 | B5 |
| Low-temperature Brittleness Test | A | A | A | A | A | A | A | A | A | B | B |
| Tensile Modulus (MPa) | 720 | 350 | 350 | 290 | 420 | 480 | 280 | 250 | 220 | 950 | 1000 |
| Bending Test (500 mmφR) | A | A | A | A | A | A | A | A | A | A | B |
| Max. Water Tree Length (μm) | 40 | 20 | 20 | 20 | 30 | 40 | 30 | 30 | 30 | 160 | 180 |
| Concentration of No. of water trees with length of 30 μm or more (water trees/cm$^3$) | 30 | 0 | 0 | 0 | 25 | 30 | 20 | 20 | 10 | 200 | 300 |

(Samples B1 and B2)

As shown in Table 1, with the sample B1 in which the insulating layer with a thickness of 1 mm was formed through extrusion molding, although the low-crystallinity resin content was more than 30 parts by mass, the melting point of the outer sample and the enthalpy of fusion of the outer sample were respectively within specified ranges. With the sample B2 in which the resin composition molded body with a thickness of 3.5 mm was formed through press-molding, although the low-crystallinity resin content was also more than 30 parts by mass, the melting point, the enthalpy of fusion, the difference in melting point, and the difference in the enthalpy of fusion were respectively within specified ranges. Based on these results, with the samples B1 and B2, all of the various cable properties were good.

The sample B1 obtained through thin extrusion was thin, and thus the entire sample B1 cooled rapidly. Therefore, the crystal growth of the propylene-based resin was not excessively inhibited. Also, the propylene-based resin was crystallized due to resin orientation, and the crystal amount was unlikely to decrease. Furthermore, the entire press-molded sample B2 cooled slowly. Thus, the crystal growth was slightly inhibited. Based on these results, it is conceivable that, with the samples B1 and B2, even when the low-crystallinity resin content was more than 22 parts by mass, the insulating properties did not deteriorate.

(Sample B3)

With the sample B3 in which the insulating layer with a thickness of 3.5 mm was formed through extrusion molding and the low-crystallinity resin content was more than 30 parts by mass, the enthalpy of fusion of the inner sample and the difference in the enthalpy of fusion were respectively out of specified ranges. Therefore, the AC breakdown strength was less than 60 kV/mm.

With the sample B3, the low-crystallinity resin content was more than 30 parts by mass, and thus, in particular, in the inner sample where the cooling speed after extrusion molding was performed was low, too much low-crystalline resin entered the propylene-based resin, and the crystal growth of the propylene-based resin was excessively inhibited. Therefore, the amount of crystals of the inner sample was small. As a result, it is conceivable that the insulating properties of the resin composition molded body deteriorated.

(Samples B4 and B5)

With the samples B4 and B5 in which the insulating layers with a thickness of 3.5 mm were formed through extrusion molding and the low-crystallinity resin content was less than 5 parts by mass, the enthalpy of fusion of the outer sample, the enthalpy of fusion of the inner sample, the difference in melting point, and the difference in the enthalpy of fusion were respectively out of specified ranges. As a result, the AC breakdown strength, the results of the low-temperature brittleness test, the tensile modulus, the maximum water tree length, and the concentration of the number of water trees were poor. The result of the bending test on the sample B5 in which the low-crystallinity resin content was 0 parts by mass was also poor.

Because the low-crystallinity resin content was less than 5 parts by mass in the samples B4 and B5, the crystal amount was large and the amount of crystals of the resin component varied in the thickness direction. Based on these results, it is conceivable that the flexibility, low-temperature brittleness resistance, insulating properties, and water tree resistance, which are examples of the various cable properties, were not ensured.

(Samples A1 to A6)

With the samples A1 to A6 in which the insulating layer with a thickness of 3 mm or more was formed through extrusion molding and the low-crystallinity resin content was in a range of 5 parts by mass or more and 30 parts by mass or less, the melting point, the enthalpy of fusion, the difference in melting point, and the difference in the enthalpy of fusion were respectively within specified ranges. As a result, the AC breakdown strength, the results of the low-temperature brittleness test, the tensile modulus, the results of the bending test, the maximum water tree length, and the concentration of the number of water trees were good.

According to the samples A1 to A6, as a result of setting the low-crystallinity resin content to 5 parts by mass or more, the resin component was kept from being close to being a propylene random polymer itself, and the crystal amount was kept from becoming excessively large. Also, variation in the amount of crystals of the resin component in the thickness direction of the resin composition molded body was suppressed. Based on these results, it was confirmed that the flexibility, low-temperature brittleness resistance, insulating properties, and water tree resistance of the various cable properties were ensured. Also, as a result of setting the low-crystallinity resin content to 30 parts by mass or less, a predetermined amount or more of crystals in the entire resin composition molded body was ensured. Based on these results, it was confirmed that the insulating properties of the resin composition molded body were improved.

Also, when the samples A2, A5, and A6 in which different low-crystallinity resins were used were compared with each other, all of the samples had various good cable properties and the various cable properties thereof were equivalent to each other.

Based on the results regarding the samples A2, A5, and A6, it was confirmed that various cable properties were ensured by using a copolymer obtained through copolymerization of at least any two of ethylene, propylene, butene, hexene, and octene, as a low-crystallinity resin.

Also, when the samples A2 and A3 whose insulating layers had different thicknesses, all of the samples had various good cable properties and the various cable properties thereof were equivalent to each other.

Based on the results regarding the samples A2 and A3, it was confirmed that, even when the thickness of the insulating layer is changed by 3 mm or more, various cable properties were ensured by setting the melting point of the outer sample, the enthalpy of fusion of the outer sample, the difference in melting point, and the difference in the enthalpy of fusion to the respective specified ranges.

<Preferable Aspects of the Present Disclosure>

Hereinafter, preferable aspects of this disclosure will be supplementarily described.

(Supplementary Description 1)
A resin composition containing:
propylene; and
ethylene,
in which the resin composition has a melting point of 140° C. or more and 150° C. or less, and
an enthalpy of fusion of the resin composition is 60 J/g or more and 100 J/g or less.

(Supplementary Description 2)
A resin composition molded body that is made of a resin composition and with which an object is covered at a thickness of 3 mm or more,
the molded body containing:
propylene; and
ethylene,
in which the molded body has a melting point of 140° C. or more and 150° C. or less,
an enthalpy of fusion of the molded body is 60 J/g or more and 100 J/g or less, and
when an outer sample is collected from a position 0.5 mm from a surface of the molded body toward the object and an inner sample is collected from a position 0.5 mm from the object toward the surface,
an absolute value of a difference obtained by subtracting the melting point of the outer sample from the melting point of the inner sample is within 8° C., and
an absolute value of a difference obtained by subtracting the enthalpy of fusion of the outer sample from the enthalpy of fusion of the inner sample is within 10 J/g.

(Supplementary Description 3)
The resin composition molded body according to Supplementary Description 2, in which a residue of a crosslinking agent is less than 300 ppm.

(Supplementary Description 4)
The resin composition molded body according to Supplementary Description 2 or 3, in which an AC breakdown electric field at room temperature is 60 kV/mm or more.

(Supplementary Description 5)
The resin composition molded body according to any one of Supplementary Descriptions 2 to 4, containing
a propylene-based resin containing propylene; and
a low-crystallinity resin made of a copolymer obtained through copolymerization of at least any two of ethylene, propylene, butene, hexene, and octene.

(Supplementary Description 6)
The resin composition molded body according to Supplementary Description 5,
in which the content of the low-crystallinity resin is 5 parts by mass or more and 30 parts by mass or less where the total content of the propylene-based resin and the low-crystallinity resin is 100 parts by mass.

(Supplementary Description 7)
The resin composition molded body according to any one of Supplementary Descriptions 2 to 6,
in which the content of an additive agent that functions as a nucleating agent for producing crystals of propylene is less than 1 part by mass where the total content of the propylene-based resin and the low-crystallinity resin is 100 parts by mass.

(Supplementary Description 8)
The resin composition molded body according to any one of Supplementary Descriptions 2 to 7,
in which, when the inner sample is hit at −25° C., no cracking occurs in the inner sample.

(Supplementary Description 9)
The resin composition molded body according to any one of Supplementary Descriptions 2 to 8,
in which the inner sample has a tensile modulus of 900 MPa or less.

(Supplementary Description 10)
The resin composition molded body according to any one of Supplementary Descriptions 2 to 9,
in which, when the inner sample is bent at a diameter of 500 mm, the inner sample does not whiten.

(Supplementary Description 11)
The resin composition molded body according to any one of Supplementary Descriptions 2 to 10,
in which, when an AC electric field with a commercial frequency of 4 kV/mm is applied to the resin composition molded body for 1000 hours in a state where the resin composition molded body is immersed in a 1 N NaCl aqueous solution at room temperature,
the maximum length of water trees occurring in the resin composition molded body is less than 150 μm.

(Supplementary Description 12)
The resin composition molded body according to any one of Supplementary Descriptions 2 to 11,
in which, when an AC electric field with a commercial frequency of 4 kV/mm is applied to the resin composition molded body for 1000 hours in a state where the resin composition molded body is immersed in a 1 N NaCl aqueous solution at room temperature,
the concentration of the number of water trees occurring in the resin composition molded body and having a length of 30 μm or more is less than 150 water trees/$cm^3$.

(Supplementary Description 13)
A power cable including:
a conductor; and
an insulating layer with which an outer circumference of the conductor is covered at a thickness of 3 mm or more,
in which the insulating layer contains propylene and ethylene,
the insulating layer has a melting point of 140° C. or more and 150° C. or less,
an enthalpy of fusion of the insulating layer is 60 J/g or more and 100 J/g or less, and
when an outer sample is collected from a position 0.5 mm from a surface of the insulating layer toward the conductor and an inner sample is collected from a position 0.5 mm from the conductor toward the surface, an absolute value of a difference between the melting point of the outer sample and the melting point of the inner sample is within 8° C., and an absolute value of a difference between the enthalpy of fusion of the outer sample and the enthalpy of fusion of the inner sample is within 10 J/g.

(Supplementary Description 14)

A method for manufacturing a power cable, including:

a step of preparing a resin composition containing propylene and ethylene; and a step of forming an insulating layer using the resin composition so as to cover an outer circumference of the conductor at a thickness of 3 mm or more, in which, in the step of forming the insulating layer, the insulating layer is formed such that the insulating layer has a melting point of 140° C. or more and 150° C. or less, an enthalpy of fusion of the insulating layer is 60 J/g or more and 100 J/g or less, and when an outer sample is collected from a position 0.5 mm from a surface of the insulating layer toward the conductor and an inner sample is collected from a position 0.5 mm from the conductor toward the surface, an absolute value of a difference between the melting point of the outer sample and the melting point of the inner sample is within 8° C., and an absolute value of a difference between the enthalpy of fusion of the outer sample and the enthalpy of fusion of the inner sample is within 10 J/g.

REFERENCE SIGNS LIST

10 Power cable
110 Conductor
120 Inner semi-conductive layer
130 Insulating layer
140 Outer semi-conductive layer
150 Shielding layer
160 Sheath

The invention claimed is:

1. A resin composition molded body that is made of a resin composition and with which an object is covered at a thickness of 3 mm or more, the molded body comprising, as hydrocarbon components, only:
   a propylene random polymer; and
   a low-crystallinity resin made of a copolymer obtained through copolymerization of at least any two of ethylene, propylene, butene, hexene, and octene,
   wherein
   the low-crystallinity resin does not have a melting point, or the low-crystallinity resin has a melting point of less than 100° C. wherein the low crystallinity resin content in the resin composition molded body is 5 parts by mass or more and 30 parts by mass or less, when the total content of the propylene-based resin and the low-crystallinity resin is 100 parts by mass,
   the molded body is non-crosslinked,
   the molded body has a melting point of 140° C. or more and 150° C. or less,
   an enthalpy of fusion of the molded body is 60 J/g or more and 100 J/g or less, and
   when an outer sample is collected from a position 0.5 mm from a surface of the molded body toward the object and an inner sample is collected from a position 0.5 mm from the object toward the surface,
   an absolute value of a difference obtained by subtracting the melting point of the outer sample from the melting point of the inner sample is within 8° C.,
   an absolute value of a difference obtained by subtracting the enthalpy of fusion of the outer sample from the enthalpy of fusion of the inner sample is within 10 J/g, and
   an AC breakdown electric field of the molded body at room temperature is 60 kV/mm or more.

2. A power cable comprising:
   a conductor; and
   an insulating layer with which an outer circumference of the conductor is covered at a thickness of 3 mm or more,
   wherein
   the insulating layer contains, as hydrocarbon components, only:
   a propylene random polymer; and
   a low-crystallinity resin made of a copolymer obtained through copolymerization of at least any two of ethylene, propylene, butene, hexene, and octene,
   the low-crystallinity resin does not have a melting point, or the low-crystallinity resin has a melting point of less than 100° C. wherein the low crystallinity resin content in the insulating layer is 5 parts by mass or more and 30 parts by mass or less, when the total content of the propylene-based resin and the low-crystallinity resin is 100 parts by mass,
   the insulating layer is non-crosslinked,
   the insulating layer has a melting point of 140° C. or more and 150° C. or less,
   an enthalpy of fusion of the insulating layer is 60 J/g or more and 100 J/g or less, and
   when an outer sample is collected from a position 0.5 mm from a surface of the insulating layer toward the conductor and an inner sample is collected from a position 0.5 mm from the conductor toward the surface,
   an absolute value of a difference between the melting point of the outer sample and the melting point of the inner sample is within 8° C.,
   an absolute value of a difference between the enthalpy of fusion of the outer sample and the enthalpy of fusion of the inner sample is within 10 J/g, and
   an AC breakdown electric field of the insulating layer at room temperature is 60 kV/mm or more.

3. The resin composition molded body according to claim 1, wherein the low-crystallinity resin is very low density polyethylene.

4. The resin composition molded body according to claim 1, wherein no cracking occurs in the inner sample when the inner sample was subjected to impact with an impact tool at −25° C. in conformity with JISK7216.

5. The resin composition molded body according to claim 1, wherein a storage modulus of the inner sample recorded at 30° C. is 900 MPa or less.

6. The resin composition molded body according to claim 1, wherein a maximum length of water trees occurring in the resin composition molded body is less than 150 μm, when an AC electric field with 60 Hz and 4 kV/mm is applied to the resin composition molded body for 1000 hours, in a state where the resin composition molded body is immersed in a 1 N NaCl aqueous solution at 27° C.

7. The resin composition molded body according to claim 1,
wherein a concentration of the number of water trees occurring in the resin composition molded body and having a length of 30 μm or more is less than 150 water trees/cm³, when an AC electric field with 60 Hz and 4 kV/mm is applied to the resin composition molded body for 1000 hours in a state where the resin composition molded body was immersed in a 1 N NaCl aqueous solution at 27° C.

8. The power cable according to claim 2,
wherein the low-crystallinity resin is very low density polyethylene.

9. The power cable according to claim 2,
wherein no cracking occurs in the inner sample when the inner sample was subjected to impact with an impact tool at −25° C. in conformity with JISK7216.

10. The power cable according to claim 2,
wherein a storage modulus of the inner sample recorded at 30° C. is 900 MPa or less.

11. The power cable according to claim 2,
wherein a maximum length of water trees occurring in a sheet obtained from the insulating layer is less than 150 μm, when an AC electric field with 60 Hz and 4 kV/mm is applied to the sheet for 1000 hours, in a state where the sheet is immersed in a 1 N NaCl aqueous solution at 27° C.

12. The power cable according to claim 2,
wherein a concentration of the number of water trees occurring in a sheet obtained from the insulating layer and having a length of 30 μm or more is less than 150 water trees/cm³, when an AC electric field with 60 Hz and 4 kV/mm is applied to the sheet for 1000 hours in a state where the sheet was immersed in a 1 N NaCl aqueous solution at 27° C.

* * * * *